(12) United States Patent
Vandame et al.

(10) Patent No.: US 10,334,229 B2
(45) Date of Patent: Jun. 25, 2019

(54) METHOD FOR OBTAINING A REFOCUSED IMAGE FROM A 4D RAW LIGHT FIELD DATA USING A SHIFT CORRECTION PARAMETER

(71) Applicant: THOMSON LICENSING, Issy les Moulineaux (FR)

(72) Inventors: Benoit Vandame, Betton (FR); Mozhdeh Seifi, Thorigne-Fouillard (FR); Valter Drazic, Betton (FR)

(73) Assignee: InterDigital CE Patent Holdings, Paris (FR)

( * ) Notice: Subject to any disclaimer, the term of this patent is extended or adjusted under 35 U.S.C. 154(b) by 0 days.

(21) Appl. No.: 15/152,255

(22) Filed: May 11, 2016

(65) Prior Publication Data

US 2016/0337632 A1 Nov. 17, 2016

(30) Foreign Application Priority Data

May 13, 2015 (EP) ..................... 15305722

(51) Int. Cl.
*H04N 13/25* (2018.01)
*H04N 13/246* (2018.01)
(Continued)

(52) U.S. Cl.
CPC ....... *H04N 13/246* (2018.05); *G02B 27/0075* (2013.01); *H04N 5/2254* (2013.01);
(Continued)

(58) Field of Classification Search
None
See application file for complete search history.

(56) References Cited

U.S. PATENT DOCUMENTS 8,243,157 B2 8/2012 Ng et al.
8,619,082 B1 12/2013 Ciurea et al.
(Continued)

FOREIGN PATENT DOCUMENTS

EP 2403234 1/2012
GB 2488905 9/2012
(Continued)

OTHER PUBLICATIONS

Ng et al., "Digital Correction of Lens Aberrations in Light Field Photography", International Optical Design Conference, Vancouver, British Columbia, Canada, Jun. 4, 2006, pp. 1-14.
(Continued)

*Primary Examiner* — Eileen M Adams
(74) *Attorney, Agent, or Firm* — Myers Wolin LLC (57) ABSTRACT

A method for obtaining a refocused image from a 4D raw light field data for a given focus ($z_{focus}$) is described. The method is remarkable in that it comprises applying a shift correction parameter on shifted and summed images from said 4D raw light field data, the shifted and summed images being defined as a function of the given focus ($z_{focus}$), and the shift correction parameter ($\Delta$) including, for at least a part of pixels of at least two sub-aperture images derived from at least one 4D light field data of a test-chart image, determined shifts for pixels belonging to the part of pixels between the at least two sub-aperture images, the test-chart image comprising patterns adequate to compute disparities between the sub-apertures images.

15 Claims, 5 Drawing Sheets

(51) Int. Cl.
*H04N 5/225* (2006.01)
*H04N 17/00* (2006.01)
*G02B 27/00* (2006.01)
*H04N 13/122* (2018.01)
*H04N 13/00* (2018.01)

(52) U.S. Cl.
CPC ........... *H04N 13/122* (2018.05); *H04N 13/25* (2018.05); *H04N 17/002* (2013.01); *H04N 2013/0074* (2013.01)

(56) References Cited

U.S. PATENT DOCUMENTS

| 8,831,377 | B2 | 9/2014 | Pitts et al. | |
|---|---|---|---|---|
| 2008/0131019 | A1* | 6/2008 | Ng | G06T 5/50 382/255 |
| 2009/0041381 | A1* | 2/2009 | Georgiev | H04N 5/225 382/280 |
| 2010/0265386 | A1 | 10/2010 | Raskar et al. | |
| 2012/0229682 | A1 | 9/2012 | Ng et al. | |
| 2013/0107085 | A1 | 5/2013 | Ng et al. | |
| 2013/0258098 | A1 | 10/2013 | Ikemoto | |
| 2014/0239071 | A1 | 8/2014 | Hennick et al. | |
| 2014/0253738 | A1 | 9/2014 | Mullis | |
| 2015/0181091 | A1* | 6/2015 | Myhre | H04N 5/2254 348/345 |

FOREIGN PATENT DOCUMENTS

| WO | WO2013167758 | 11/2013 |
|---|---|---|
| WO | WO2013180192 | 12/2013 |

OTHER PUBLICATIONS

Levoy et al., "Recording and Controlling the 4D Light Field in a Microscope Using Microlens Arrays", Journal of Microscopy, vol. 235, No. 2. Aug. 2009, pp. 144-162.

Berkner et al., "End-to-End System Model for Plenoptic Cameras", Ricoh Technical Report No. 39, Jan. 2014, pp. 21-28.

Bishop et al., "The Light Field Camera: Extended Depth of Field, Aliasing, and Superresolution", IEEE Transactions on Pattern Analysis and Machine Intelligence, vol. 34, No. 5, May 2012, pp. 972-986.

Levin et al., "Image and depth from a conventional camera with a coded aperture", ACM Transactions on Graphics, vol. 26, No. 3, Article 70, Jul. 2007, pp. 1-10.

Levin et al., "Understanding camera trade-offs through a Bayesian analysis of light field projections", 10th Conference European on Computer Visio, Marseille, France, Oct. 12, 2008, pp. 1-14.

Wanner et al., "Generating EPI Representations of 4D Light Fields with a Single Lens Focused Plenoptic Camera", 7th International Symposium on Visual Computing, Las Vegas, Nevada, USA, Sep. 26, 2011, pp. 90-101.

Ren Ng, "Digital Light Field Photography," A Dissertation Submitted to the Department of Computer Science and the Committee on Graduate Studies of Stanford University in Partial Fulfillment of the Requirements for the Degree of Doctor of Philosophy, Jul. 2006, pages.

Edward R. Dowski, Jr., et al, "Extended depth of field through wave-front coding," Applied Optics, vol. 34, No. 11, 1995 Optical Society of America, Apr. 10, 1995, pp. 1859-1866.

* cited by examiner

METHOD FOR OBTAINING A REFOCUSED IMAGE FROM A 4D RAW LIGHT FIELD DATA USING A SHIFT CORRECTION PARAMETER

This application claims the benefit, under 35 U.S.C. § 119 of European Patent Application No. 15305722.9, filed May 13, 2015.

TECHNICAL FIELD

The disclosure relates to 4D light field data processing. More precisely, the disclosure relates to a technique for correcting or at least reducing the effect of optical aberrations induced by the main lens of a 4D light field data acquisition device.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The acquisition of 4D light-field data), which can be viewed as a sampling of a 4D light field (i.e. the recording of light rays as explained in FIG. 1 of the article: "*Understanding camera trade-offs through a Bayesian analysis of light field projections*" by Anat Levin and al., published in the conference proceedings of ECCV 2008) is an hectic research subject.

Indeed, compared to classical 2D images obtained from a camera, 4D light-field data enable a user to have access to more post processing features that enhance the rendering of images and/or the interactivity with the user. For example, with 4D light-field data, it is possible to perform with ease refocusing of images a posteriori (i.e. refocusing with freely selected distances of focalization meaning that the position of a focal plane can be specified/selected a posteriori), as well as changing slightly the point of view in the scene of an image. In order to acquire 4D light-field data, several techniques can be used. Especially, a plenoptic camera, as depicted in document WO 2013/180192 or in document GB 2488905, is able to acquire 4D light-field data. Details of the architecture of a plenoptic camera are provided in FIGS. 1, 2, 3, 4 and 5 of the present document.

In the state of the art, there are several ways to represent (or define) 4D light-field data. Indeed, in the Chapter 3.3 of the Phd dissertation thesis entitled "*Digital Light Field Photography*" by Ren Ng, published in July 2006, three different ways to represent 4D light-field data are described. Firstly, 4D light-field data can be represented, when recorded by a plenoptic camera as the one depicted in FIG. 1 for example, by a collection of micro-lens images (see the description of FIG. 2 in the present document). 4D light-field data in this representation are named raw images (or raw 4D light-field data). Secondly, 4D light-field data can be represented, by a set of sub-aperture images. A sub-aperture image corresponds to a captured image of a scene from a point of view, the point of view being slightly different between two sub-aperture images. These sub-aperture images give information about the parallax and depth of the imaged scene (see the description of FIG. 7 for more details). Thirdly, 4D light-field data can be represented by a set of epipolar images (see for example the article entitled: "*Generating EPI Representation of a 4D Light Fields with a Single Lens Focused Plenoptic Camera*", by S. Wanner and al., published in the conference proceedings of ISVC 2011).

However, it should be noted that a device that can acquire 4D light-field data such as a plenoptic camera, may have some optical aberrations on the main lens. Among optical aberrations one distinguishes: spherical aberrations, astigmatism, coma, lateral chromatic aberrations, axial chromatic aberrations, etc. Therefore, these optical aberrations degrade the quality of images derived from the acquired 4D light-field data.

One solution to overcome this issue is described in the article: "*Digital Correction of Lens Aberrations In Light Field Photography*" by Ren Ng and Pat Hanrahan. In this article, using a plenoptic camera the authors propose to compute a shift correction parameter using photon propagation through the real lenses versus photon propagation versus an ideal thin lens approximating the real lens. More precisely, the shift correction parameter corresponds to the ray correction function that is obtained from ray tracing differences between an ideal ray space (based on an ideal lens modeling) and an aberrated ray space. Thus, the technique proposed in this article relies on a precise knowledge of all the optical elements (shape, material) which define the main-lenses, and is based on ray tracing technique.

The proposed technique in this document does not need to have such sharp knowledge of all the elements of the main-lenses for obtaining a shift correction parameter.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure is directed to a method for obtaining a refocused image from a 4D raw light field data for a given focus ($z_{focus}$). The method is remarkable in that it comprises applying a shift correction parameter on shifted and summed images from said 4D raw light field data, said shifted and summed images being defined as a function of said given focus ($z_{focus}$), and said shift correction parameter ($\Delta$) comprising, for at least a part of pixels of at least two sub-aperture images derived from at least one 4D light field data of a test-chart image, determined shifts for pixels belonging to said part of pixels between said at least two sub-aperture images, said test-chart image comprising patterns adequate to compute disparities between said sub-apertures images.

Hence, said test chart image is chosen such that contrasted details are comprised within it, without flat areas.

Instead of determining a shift correction parameter from the knowledge of the geometry of the main lens as in document U.S. Pat. No. 8,243,157, the proposed technique determines shift (at the pixel level) of sub-aperture images via a test-chart image comprising pattern that ease the computation of disparity values. Indeed, the present technique is based on the measurement of disparity values contrary to the prior art techniques.

It should be noted that said patterns may vary considerably from one test chart image to the other, in a manner difficult to define whilst still providing the desired effect being to ease the disparity computation between sub-aperture images.

In a preferred embodiment, the method for obtaining a refocused image is remarkable in that said determined shifts are obtained by a patch based shift estimation method that uses an expected shift between pixels of said at least two sub-aperture images.

In a preferred embodiment, the method for obtaining a refocused image is remarkable in that said shifted and summed images correspond to shifted and summed sub-aperture images.

In a preferred embodiment, the method for obtaining a refocused image is remarkable in that said shifted and summed images correspond to on shifted and summed micro-lens images.

In a preferred embodiment, the method for obtaining a refocused image is remarkable in that said test chart image comprises locally contrasted textures visible on most of area of said at least two sub-aperture images derived from said 4D light field data of a test-chart image.

In a preferred embodiment, the method for obtaining a refocused image is remarkable in that said shift correction parameter is correlated to a main lens aberration, said main lens being comprised in a device that has acquired said 4D light field data of a test-chart image.

In a preferred embodiment, the method for obtaining a refocused image is remarkable in that said aberration is a spherical aberration.

In a preferred embodiment, the method for obtaining a refocused image is remarkable in that said aberration is a chromatic aberration.

In a preferred embodiment, the method for obtaining a refocused image is remarkable in that said shift correction parameter is represented by a polynomial function.

In a preferred embodiment, the method for obtaining a refocused image is remarkable in that said at least two sub-aperture images derived from at least one 4D light field data of a test-chart image are further derived from 4D light field data of a white image for a normalization process.

In a preferred embodiment, the method for obtaining a refocused image is remarkable in that said shift correction parameter is further used on zoomed images derived from said 4D raw light field data.

In a preferred embodiment, the method for obtaining a refocused image is remarkable in that said shift correction parameter ($\Delta$) comprises, for all the pixels of all sub-aperture images derived from at least one 4D light field data of a test-chart image, determined shifts for all the pixels.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc. In a variant, the hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

It should also be noted that a step of obtaining an element/value in the present document can be viewed either as a step of reading such element/value in a memory unit of an electronic device or a step of receiving such element/value from another electronic device via communication means.

In another embodiment, it is proposed an electronic device for obtaining a refocused image from a 4D raw light field data for a given focus ($z_{focus}$). The electronic device is remarkable in that it comprises a module for applying a shift correction parameter on shifted and summed images from said 4D raw light field data, said shifted and summed images being defined as a function of said given focus ($z_{focus}$), and said shift correction parameter ($\Delta$) comprising, for at least a part of pixels of at least two sub-aperture images derived from at least one 4D light field data of a test-chart image, determined shifts for pixels belonging to said part of pixels between said at least two sub-aperture images, said test-chart image comprising patterns adequate to compute disparities between said sub-apertures images.

In another embodiment, it is proposed a method for calibrating a plenoptic camera. The method being is remarkable in that it comprises
  acquiring a 4D light field data of a test-chart image, said test-chart image comprising patterns adequate to compute disparities between said sub-apertures images;
  obtaining at least two sub-aperture images from said a 4D light field data;
  and for at least a part of pixels of said at least two sub-aperture images,
  determining a shift correction parameter ($\Delta$) comprising determined shifts for pixels belonging to said part of pixels between said at least two sub-aperture images.

BRIEF DESCRIPTION OF THE DRAWINGS

The above and other aspects of the invention will become more apparent by the following detailed description of exemplary embodiments thereof with reference to the attached drawings in which:

FIG. 8(*a*) presents an example of a test chart that can be used in the process described in FIG. 7;

FIG. 8(*b*) presents another example of a test chart that can be used in the process described in FIG. 7;

DETAILED DESCRIPTION

Figure 1:
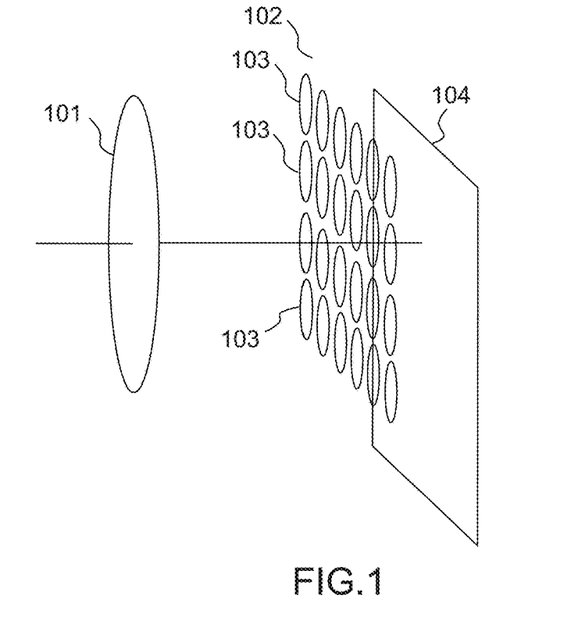
FIG. 1 present schematically the main components comprised in a plenoptic camera that enables the acquisition of light field data on which the present technique can be applied.

FIG. 1 present schematically the main components comprised in a plenoptic camera that enables the acquisition of light field data on which the present technique can be applied.

More precisely, a plenoptic camera comprises a main lens referenced 101, and a sensor array (i.e. an array of pixel sensors (for example a sensor based on CMOS technology)), referenced 104. Between the main lens 101 and the sensor array 104, a microlens array referenced 102, that comprises a set of micro lenses referenced 103, is positioned. It should be noted that optionally some spacers might be located between the micro-lens array around each lens and the sensor to prevent light from one lens to overlap with the light of other lenses at the sensor side. It should be noted that the main lens 101 can be a more complex optical system as the one depicted in FIG. 1 (as for example the optical system described in FIGS. 12 and 13 of document GB2488905) Hence, a plenoptic camera can be viewed as a conventional camera plus a micro-lens array set just in front of the sensor as illustrated in FIG. 1. The light rays passing through a micro-lens cover a part of the sensor array that records the radiance of these light rays. The recording by this part of the sensor defines a micro-lens image.

As in a conventional camera, the main lens of a plenoptic camera can have some aberrations. Indeed, even main-lens with complex optical elements suffers from optical aberrations especially when the main-lens is used wide open. In a conventional camera, the analysis of the point spread function (PSF) which is a mathematical function that describes the response of the optic of the conventional camera to a point source or point object, enables the detection and correction of aberrations in the main lens (or in the optic system equivalent to the main lens) via a deconvolution process. For example Zernike polynomials can be used to represent the point spread function. In a variant, a blind deconvolution process can be used. However, such deconvolution process can generate ringing artefacts (that are wavelike artifacts that could appear near strong edges in an image), increase the noise level . . . . One way to detect and correct optical aberrations in a plenoptic camera is based on the analysis of the pupil image function (PIF) which is analogous to the point spread function as described in the article entitled: "*End to End System Model for Plenoptic Cameras*" by Kathrin Berkner et al., in the Ricoh Technical Report No. 39, published in January 2014. The present technique can be viewed as an alternative to this complex approach, that does not introduced additional artefacts (as a deconvolution process adapted to the plenoptic camera would do).

Figure 2:
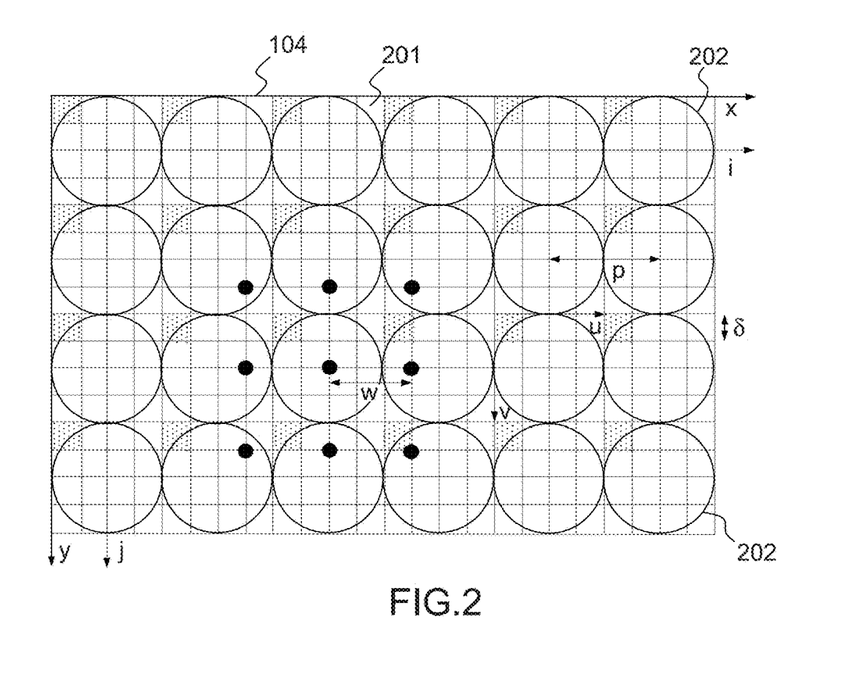
FIG. 2 present another view of the sensor array disclosed in FIG. 1.

FIG. 2 present an image captured by the sensor array 104. Indeed, in such view, it appears that the sensor array 104 comprises a set of pixels, referenced 201. The light rays passing through a micro-lens cover a number of pixels 201, and these pixels record the energy value of light rays that are incident/received.

Hence the sensor array 104 of a plenoptic camera records an image which comprises a collection of 2D small images (i.e. the micro-lens images referenced 202) arranged within a 2D image (which is also named a raw 4D light-field image). Indeed, each small image (i.e. the micro-lens images) is produced by a micro-lens (the micro-lens can be identified by coordinates (i,j) from the array of lens). Hence, the pixels of the light-field are associated with 4 coordinates (x,y,i,j). L(x,y,i,j) being the 4D light-field recorded by the sensor illustrates the image which is recorded by the sensor. Each micro-lens produces a micro-image represented by a circle (the shape of the small image depends on the shape of the micro-lenses which is typically circular). Pixel coordinates (in the sensor array) are labelled (x,y). p is the distance between 2 consecutive micro-images, p is not necessary an integer value. Micro-lenses are chosen such that p is larger than a pixel size δ. Micro-lens images are referenced by their coordinate (i,j). Each micro-lens image samples the pupil of the main-lens with the (u,v) coordinate system. Some pixels might not receive any photons from any micro-lens especially if the shape of the micro-lenses is circular. In this case, the inter micro-lens space is masked out to prevent photons to pass outside from a micro-lens, resulting in some dark areas in the micro-images. If the micro-lenses have a square shape, no masking is needed). The center of a micro-lens image (i,j) is located on the sensor at the coordinate $(x_{i,j}, y_{i,j})$. θ is the angle between the square lattice of pixel and the square lattice of micro-lenses, in FIG. 2 θ=0. Assuming the micro-lenses are arranged according to a regular square lattice, the $(x_{i,j}, y_{i,j})$ can be computed by the following equation considering $(x_{0,0}, y_{0,0})$ the pixel coordinate of the micro-lens image (0,0):

$$\begin{bmatrix} x_{i,j} \\ y_{i,j} \end{bmatrix} = p \begin{bmatrix} \cos\theta & -\sin\theta \\ \sin\theta & \cos\theta \end{bmatrix} \begin{bmatrix} i \\ j \end{bmatrix} + \begin{bmatrix} x_{0,0} \\ y_{0,0} \end{bmatrix}$$

FIG. 2 also illustrates that an object from the scene is visible on several contiguous micro-lens images (dark dots). The distance between 2 consecutive views of an object is w, this distance is named the replication distance. Hence, an object is visible on r consecutive micro-lens images with:

$$r = \left\lfloor \frac{p}{|p-w|} \right\rfloor$$

r is the number of consecutive micro-lens images in one dimension. An object is visible in $r^2$ micro-lens images. Depending on the shape of the micro-lens image, some of the $r^2$ views of the object might be invisible.

More details related to plenoptic camera can be found out in the Section 4 entitled "*Image formation of a Light field camera*" in the article entitled "*The Light Field Camera: Extended Depth of Field, Aliasing, and Superresolution*" by Tom E. Bishop and Paolo Favaro, published in the IEEE Transactions on Pattern Analysis and Machine Intelligence, Vol. 34, N° 5, in May 2012.

It should be noted that the present technique can also be applied on "conventional camera" (in the sense that no additional micro-lens array is positioned between the main lens and array of pixels), in the case that at least a part of the pixels of such conventional camera are designed in the same way (or similar way) as the one described in the document US2013258098. Indeed, document US2013258098 discloses a pixel that can record light field data due to the use of several light receiving sections (for example referenced 116 and 117 in document US2013258098). Hence, one skilled in the art could assimilate such conventional camera with an array of pixels integrating the technique of document US2013258098 as a kind of plenoptic camera as depicted in FIG. 1, in which each micro-lens concentrates light rays on two pixels comprised in the sensor 104. It should be noted that technique of document US2013258098 can be generalized in the sense that a pixel can record more than two data information (obtained by the two low and high receiving sections), if more receiving section are integrated in the architecture of a pixel. The present disclosure can reduce the aberrations of the main lens of such "conventional camera" integrating pixels that can record light field data as mentioned previously.

It should also be noted that the present disclosure can also be applied to other devices that acquire 4D light field data such as devices that comprise coded aperture elements as depicted in document US 2010/0265386, or in the article entitled "*Image and depth from a conventional camera with a coded aperture*" by A. Levin a al., published in the proceedings of SIGGRAPH 2007, or use wavefront coding techniques as mentioned in the article entitled "Extended depth of field through wave-front coding" by Edward R. Dowski, Jr., and W. Thomas Cathe, published in Applied Optics, 1995 Apr. 10.

Figure 3:
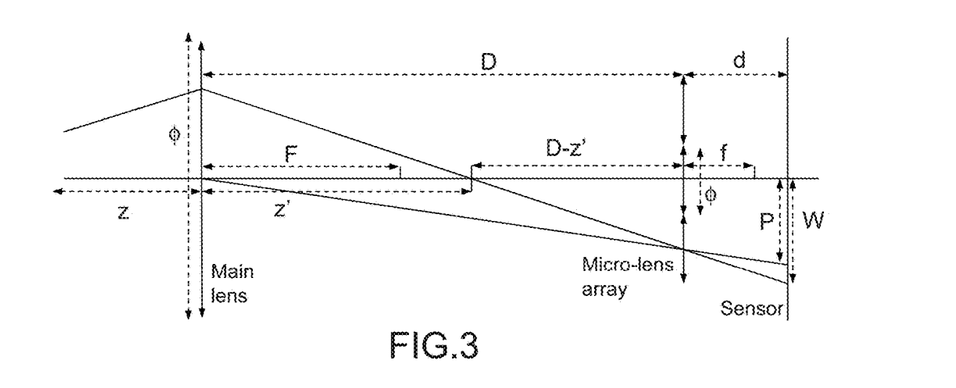
FIG. 3 illustrates a schematic plenoptic type II camera assuming perfect thin lens model.
Figure 4:
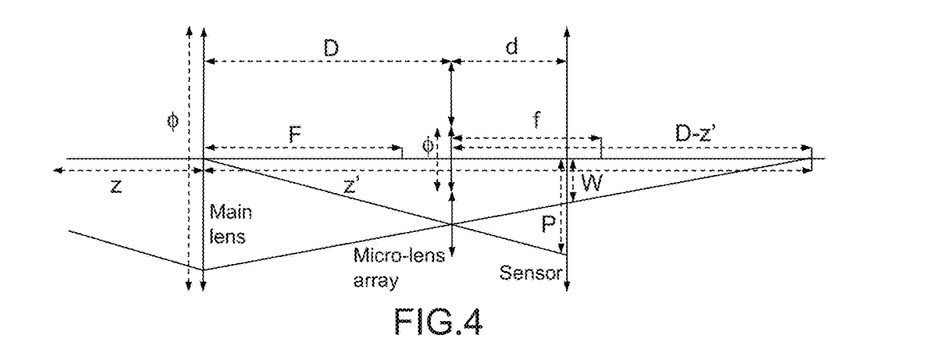
FIG. 4 illustrates another schematic plenoptic type II camera assuming perfect thin lens model.

FIG. 3 and FIG. 4 illustrate a schematic plenoptic type II camera assuming perfect thin lens model. The distances p and w introduced previously are given in unit of pixel. They are converted into physical unit distance (meters) respectively P and W by multiplying them by the pixel size δ: W=δ·w and P=δ·p. These distances depends on the light-field camera characteristics.

The main-lens has a focal length F and an aperture Φ. The micro-lens array is made of micro-lenses having a focal length f. The pitch of the micro-lens array is φ. The micro-lens array is located at a distance D from the main-lens, and a distance d from the sensor. The object (not visible on the figures) is located at a distance z from the main-lens (left). This object is focused by the main-lens at a distance z' from the main-lens (right).

FIG. 3 and FIG. 4 illustrate the cases where respectively D>z' and D<z'. In both cases, micro-lens images can be in focus depending on d and f. This design refers to the so-called type II plenoptic camera (also named plenoptic camera 2.0).

Figure 5:
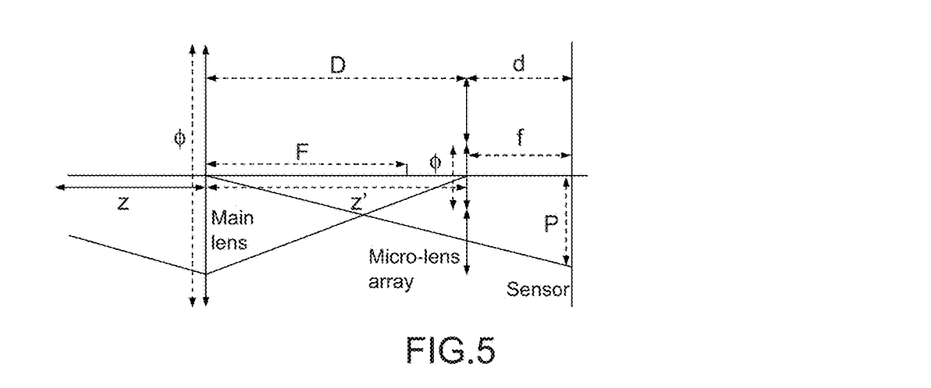
FIG. 5 illustrates a schematic plenoptic type I camera assuming perfect thin lens model.

FIG. 5 presents a type I plenoptic camera (also named plenoptic camera 1.0), in which f=d.

In FIG. 5, the design is made such that the main-lens is focusing images close to the micro-lens array. If the main-lens is focusing exactly on the micro-lens array, then W=∞. Also the micro-lens images are fully out-of-focus and equal to a constant (not considering noise).

The replication distance W varies with the z the distance of the object. To establish the relation between W and z, one relies on the thin lens equation:

$$\frac{1}{z} + \frac{1}{z'} = \frac{1}{F}$$

And the Thales law:

$$\frac{D-z'}{\phi} = \frac{D-z'+d}{W}$$

Mixing the 2 previous equations on deduces:

$$W = \phi\left(1 + \frac{d}{D - \frac{zF}{z-F}}\right)$$

The relation between W and z does not assume that the micro-lens images are in focus. Micro-lens images are strictly in focus according to the thin lens equation:

$$\frac{1}{D-z'} + \frac{1}{d} = \frac{1}{f}$$

Also from the Thales law one derives P $$e = \frac{D+d}{D}$$
$$P = \phi e$$

The ratio e defines the enlargement between the micro-lens pitch and the micro-lens images pitch. This ratio is very close to 1 since D»d.

Similar remarks can be found out in document WO 2013/167758.

As mentioned previously, 4D light field data can be represented by a set of sub-aperture images.

Indeed, the micro-images can be re-organized into the so-called sub-aperture images. A sub-aperture images collects all 4D light-field pixels (i.e. the pixels that are positioned on the sensor plane located behind the micro-lens) having the same (u,v) coordinates (the (u,v) coordinates correspond to coordinates on the main lens pupil).

In view of the FIG. 2, let (I,J) being the number of micro-lenses covering the sensor, and ($N_x$,$N_y$) the number of pixels of the sensor. The number of sub-aperture images is equal to p×p. Each sub-aperture image have a size of (I,J)=($N_x$/p,$N_y$/p) pixels.

Figure 6:
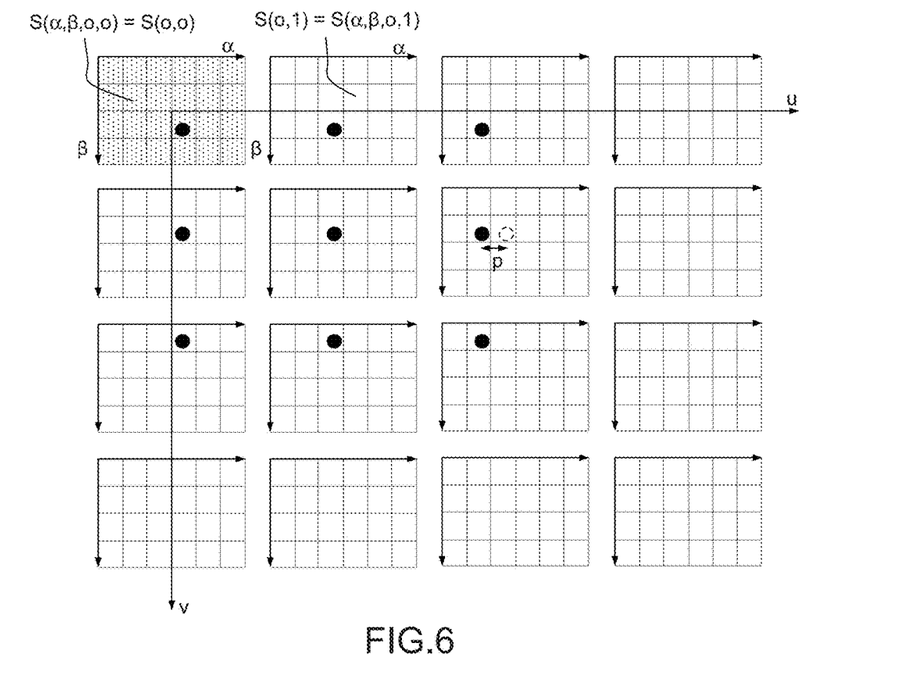
FIG. 6 illustrates a set of sub-aperture images.

FIG. 2 and FIG. 6 illustrate the conversion between the captured light-field image coordinate L(x,y,i,j) into the series of sub-aperture images S($\alpha,\beta,u,v$). Each sub-aperture image has a size of (I,J) pixels, the axis are labeled ($\alpha,\beta$) with ($\alpha,\beta$)∈[0,I[×[0, J[. S(u,v) denotes the 2D image corresponding to the (u,v) pupil coordinate made of I×J pixels. The relations between (x,y,i,j) and ($\alpha,\beta,u,v$) are defined as follow:

$$(\alpha, \beta, u, v) = \left(\left\lfloor\frac{x}{p}\right\rfloor, \left\lfloor\frac{y}{p}\right\rfloor, x \bmod p, y \bmod p\right)$$

Where $\lfloor \cdot \rfloor$ denotes the floor function, and mod denotes the modulo reduction function.

If p is not exactly an integer but close to an integer, then the sub-aperture images can be computed easily considering the distance between the micro-lens image equal to $\lfloor p \rfloor$ the integer just greater than p. This case occurs especially when the micro-lens diameter $\phi$ is equal to an integer number of pixels. In the case, p=$\phi$e being slightly larger than $\phi$ since e=(D+d)/d is slightly greater than 1. The advantage of considering $\lfloor p \rfloor$ is that the sub-aperture images are computed without interpolation since one pixel L(x,y,i,j) corresponds to an integer coordinate sub-aperture pixel S($\alpha,\beta,u,v$). The drawback is that the portion of a the pupil from which photons are recorded is not constant within a given sub-aperture image S(u,v). To be precise, S(u,v) sub-aperture image is not exactly sampling the (u,v) pupil coordinate. Nevertheless, even though the sub-apertures images are sampling a (u,v) coordinate which varies slightly with the pixel coordinate ($\alpha,\beta$) the proposed invention is effective. If p is not an integer, or if the micro-lens array is rotated versus the pixel array, then the sub-aperture images need to be computed using interpolation since the centers ($x_{i,j}$,$u_{i,j}$) of the micro-lenses are not integer.

Within the light-field image L(x,y,i,j) an object is made visible on several micro-images with a replication distance w. On the sub-aperture images, an object is also visible several times. From one sub-aperture image to the next horizontal one, an object coordinate ($\alpha,\beta$) appears shifted by the disparity ρ. The relation between ρ and w is defined by:

$$\rho = \frac{1}{w-p}$$

Also it is possible to establish a relation between the disparity ρ and the distance z of the object by mixing the two following equations $$W = \phi\left(1 + \frac{d}{D - \frac{zF}{z-F}}\right) \text{ and } \rho = \frac{1}{w-p},$$

it can be derived that $$\rho = \frac{\delta D}{\phi d}\left(\frac{D}{z'} - 1\right)$$

Figure 7:
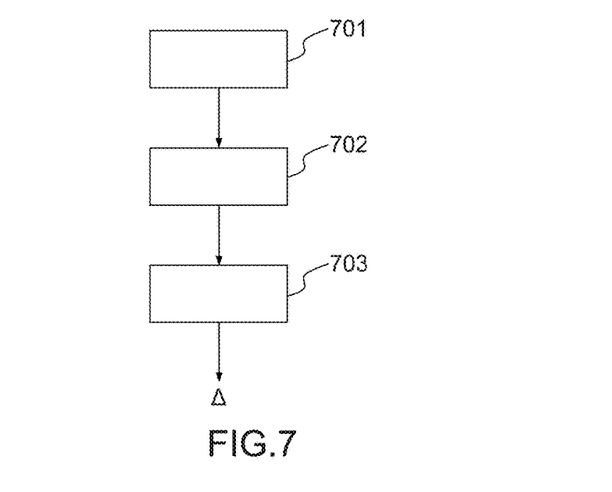
FIG. 7 illustrates some steps of a method for obtaining a shift correction parameter according to one embodiment of the invention.

FIG. 7 presents a flowchart according to one embodiment of the invention.

More precisely, the FIG. 7 illustrates some steps of a method for obtaining a shift correction parameter according to one embodiment of the invention.

In order to obtain a shift correction parameter, an electronic device (as the one depicted in FIG. 10 for example) obtains, in a step referenced 701, a first raw 4D light field data of a white image, and a second raw 4D light field data of a test chart image, taken by a same light field acquisition device, or by two light field acquisition devices that have similar/close/identical optical features (main lens, etc.), in the case that these two light field acquisition devices have been outputted by the same production line in a factory. It should be noted that in one embodiment, the first and second raw 4D light field data are acquired by the same light field acquisition device, which comprises said electronic device. If the acquisition device that acquires the second raw 4D light field data is a type I plenoptic camera, the main-lens should produce a sharp image of the test chart on the micro-lens array, Hence, The test chart should be positioned such that ρ=0. In a variant, if the acquisition device that acquires the second raw 4D light field data is a type II plenoptic camera, the main-lens should be positioned such that the micro-lens images are in focus.

In one embodiment, it should also be noted that the obtaining of the first raw 4D light field data of a white image is not done. Indeed, as explained below, the first raw 4D light field data is used only for normalization purpose.

Then, in a step referenced 702, the electronic device determines/extracts a first and a second set of sub-aperture images from respectively the first and the second raw 4D light field data.

It should be noted that in one embodiment, the electronic device obtains directly the first and second set of sub-aperture images without having to determine them.

Then, in a step referenced 703, the electronic device determines the shift estimation between sub-aperture images of said first and second set of sub-aperture images.

More precisely, the sub-aperture images $S_T(u,v)$ and $S_N(u,v)$ are extracted respectively from the first raw 4D light-field data N, and the second raw 4D light field data T. Optionally the sub-aperture images $S_T(u,v)$ are normalized by the white image $S_N(u,v)$. In other words the pixels $S_T(\alpha,\beta,u,v)$ are transformed into $S_T(\alpha,\beta,u,v)/S_N(\alpha,\beta,u,v)$. Applying the normalization with the white image enables the removing of the vignetting of the main-lens which makes sub-aperture images to appear with different brightness.

If the pixels of the sensor or the lenses of the micro-lens array are covered with a Color Filter Array (CFA), then the sub-aperture images are de-mosaicked before being combined into refocused image. The Sub-aperture images are therefore considered to be color images with typically three color components per pixel (red, green, blue).

The shift between the sub-aperture images $S_T(0,0)$ and $S_T(u,v)$ should be equal to $(u\rho,v\rho)$ assuming perfect lens model. Aberrations of the main-lens makes this shift varying locally depending on the pixel coordinate $(\alpha,\beta)$ Step 703 enables the estimation of local shifts between $S_T(0,0)$ and $S_T(u,v)$ using common method as for instance the so-called patch based shift estimation or a technique used in optical flow for determining pattern of apparent motion of objects, such as Lucas-Kanade method, Horn-Schunck method, etc (that are differential methods for optical flow estimation). The local shifts are recorded into the shift correction parameter $\Delta(\alpha,\beta,u,v)$. $\Delta(u,v)$ records the local shift of all pixels $(\alpha,\beta)$ of the sub-aperture image $S_T(u,v)$.

Then, for determining the local shift at pixel $(\alpha,\beta)$ between $S_T(0,0)$ and $S_T(u,v)$ the following procedure is applied by an electronic device:

1. A patch $P_{ref}$ of N×N pixels (with for instance N=31 for a precise estimation) is extracted around pixel $(\alpha,\beta)$ from image $S_T(0,0)$.
2. Patches $P_{a,b}$ of the same size if extracted from the image $S_T(u,v)$ centered on pixel $(\alpha+\rho u+a,\beta+\rho v+b)$. Where (a,b) are integers such that $(a,b)\in[-c,c]^2$ where c defines the radius of a window search. c is typically equal to the couple of pixels which corresponds to the typical size of spot diagrams. Obviously, in the case that pixels $(\alpha,\beta)$ to be processed are located in the boundary of the sub-aperture images, the shape/geometry of the patches $P_{ref}$ and $P_{a,b}$ have to be adapted.
3. The Sum of Absolute Difference (SAD) or the Sum of Square Difference (SSD) is computed between reference path $P_{ref}$ and the patches $P_{a,b}$. The SAD or SSD have a minimum value for a given patch position (a,b). (a,b) indicates the local shift between the sub-aperture image $S_T(0,0)$ and $S_T(u,v)$ for the pixel $(\alpha,\beta)$.
4. The shift (a,b) is stored in a optical flow $\Delta(\alpha,\beta,u,v)=$ (a,b) which records the local shift of pixels $(\alpha,\beta)$ of the sub-aperture image $S_T(0,0)$ versus the sub-aperture images $S_T(u,v)$.

The computation of the local shift (a,b) can be done at a sub-pixel precision by using interpolation when extracting a patch from $S_T(u,v)$ with (a,b) being non integer. The local shift computation must be performed with great accuracy to ensure aberration corrections. The local shift estimation is made possible since the test-chart image is located at a fix distance z of the camera, and also the test-chart image is chosen to be textured to ensure the robustness of the local shift estimation. Other methods can be used to compute the local shifts and save them into the shift correction parameter $\Delta(\alpha,\beta,u,v)$. The optical flow is computed for a given value of the main-lens aperture $\Phi$, and focalization distance tuned with D. Indeed, the optical aberrations are varying with these main-lens parameters.

The procedure is applied for all pixels $(\alpha,\beta)$ of the sub-aperture image $S_T(0,0)$. One obtains the shift correction parameter $\Delta$ which records the local shifts between the pixels of $S_T(\alpha,\beta,0,0)$ and the pixels of the p×p sub-aperture images $S_T(\alpha,\beta,u,v)$. In a variant, the procedure is applied only for pixels belonging to a part of pixels of the sub-aperture image $S_T(0,0)$.

In one embodiment of the invention, the electronic device stores directly the shift correction parameter $\Delta$.

However, the shift correction parameter $\Delta(\alpha,\beta,u,v)$ is a large data since it records a shift (2 values) for all the pixels $(\alpha,\beta)$ of the sub-aperture images (u,v). This large amount of data can be modeled with polynomial functions or other family of functions. For instance $\Delta(\alpha,\beta,u,v)=$ $(\Sigma_{k=0}^{k=N}\Sigma_{l=0}^{l=N}a_{kl}(u,v)\alpha^k\beta^l,\Sigma_{k=0}^{k=N}\Sigma_{l=0}^{l=N}b_{kl}(u,v)\alpha^k\beta^l)$ where $a_{kl}(u,v)$ and $a_{kl}(u,v)$ are the coefficient of 2 polynomial functions of order N which depends also on the pupil coordinate (u,v).

A model is used for all the shifts associated to a given (u,v). $\Delta(u,v)$ is made of (I,j) 2D vectors. Each vector component is modeled with polynomial function using for instance Least Square Estimation (LSE).

One obtains 2 models per (u,v) coordinate. The model is made of only few parameters for instance the parameters $a_{kl}(u,v)$ and $b_{kl}(u,v)$ and are easier to record in smaller data structure. The re-focusing is performed easily by computing the values $\Delta(\alpha,\beta,u,v)$ from the models.

It should be noted that main-lens are subject to chromatic aberrations since the lens materials have refraction indices which vary with the photon wavelength. To correct the refocused images from the chromatic aberrations, the computation of the shift correction parameter $\Delta$ is performed using one color component of the sub-aperture images, as for instance $S_T(0,0,\text{green})$. The shift correction parameter $\Delta(\alpha,\beta,u,v,\lambda)$ is now in 5D. The local shift estimation is performed for each color channel of the sub-aperture images $\Delta(u,v,\lambda)$ versus $S_T(0,0,\text{green})$. Image refocusing considering $\Delta(\alpha,\beta,u,v,\lambda)$ is able of correcting longitudinal and radial chromatic aberrations.

In one embodiment of the disclosure, the sub-aperture image which serves as reference is the $S_T(0,0)$ (i.e. the shift correction parameter $\Delta$ is obtained by determining shifts between the sub-aperture images $S_T(0,0)$ and all the other sub-aperture images $S_T(u,v)$. Other sub-aperture images could be used as reference (for example, instead of using $S_T(0,0)$ as the reference that is used to determine shifts with other sub-aperture images, another sub-aperture can be used (taken at random for example)). In another embodiment it is possible to use a refocused image computed for a given disparity $\rho_{focus}$ without considering the shift correction parameter $\Delta$. Using the refocused image as reference is advantageous because it makes the shift correction parameter $\Delta$ to refer to the complete pupil of the camera, and not only a short portion observed by a given sub-aperture image.

In a variant, the shift correction parameter is determined for only a subset of sub-aperture images $S_T$ (i.e. Step 703, not all the sub-aperture images $S_T$ are processed).

In a variant, instead of using a unique reference, in step 703, two different pairs of sub-aperture images are used for determining the pixels shifts. For instance if the shifts $\Delta_1$ is computed between the sub-aperture images $S_T(u_{ref}, v_{ref})$ and $S_T(u_1, v_1)$ and the shift $\Delta_2$ is computed between the sub-aperture images $S_T(u_1, v_1)$ and $S_T(u_2, v_2)$. Then the shift $\Delta_2$ is converted into the referential $(u_{ref}, v_{ref})$ by adding the shifts of $\Delta_1$ into $\Delta_2$. Step by step it is possible to convert the local shifts between 2 sub-aperture images $S_T(u_1, v_1)$ and $S_T(u_2, v_2)$ into shift according to a unique sub-aperture image $(u_{ref}, v_{ref})$ used are reference.

Figure 8A:
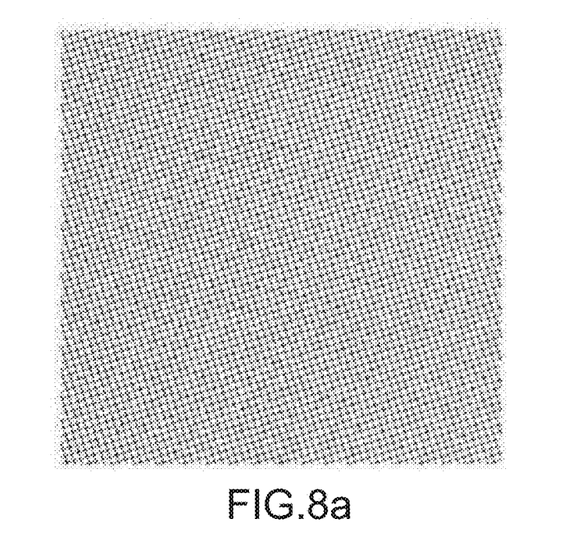
Figure 8B:
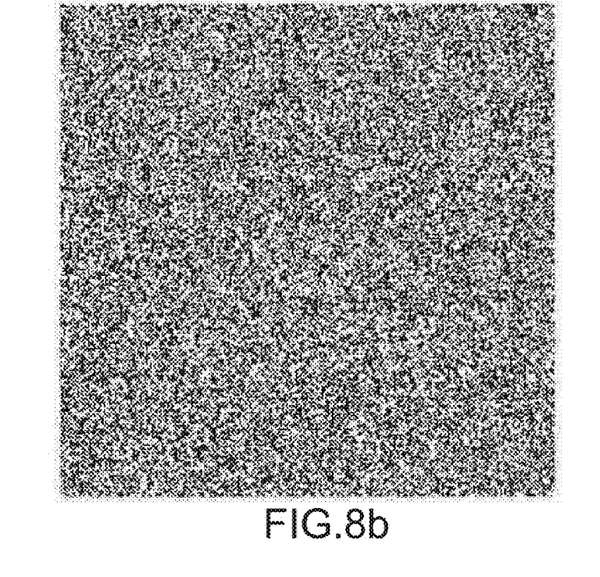

FIGS. 8(*a*) and 8(*b*) present two examples of a test chart that can be used in the process described in FIG. 7.

FIG. 8(*a*) represents an image comprising a regular grid and FIG. 8(*b*) represents an image comprising a random back and white pattern, that can be used as test chart.

Light-field images of the test-chart image and the white image are taken with the same camera settings (aperture, distance D between the main-lens to the micro-lens array), exposure times are chosen to prevent saturation. The test-chart imageT is positioned perpendicular to the optical axis of the camera at a distance z corresponding to a given replication distance w and disparity ρ. In a type I camera, the main-lens will typically focus on the test-chart image at distance z to produce a sharp image on the micro-lens array, thus having a disparity ρ=0.

More generically, the test chart is defined by locally contrasted textures visible on every area of the sub-aperture images. Indeed, if some areas of the test chart is showing constant colors, then the local shift estimation performed on the sub-aperture images at these locations is not possible since shift estimation cannot estimate shift between two image portions with no contrast. Possibly, the test chart being used could be a common chessboard. In this case only the shifts computed at the corners of white and dark boxes of the chessboard are valid. A mathematical model is then used to estimated shifts at any coordinates.

Figure 9:
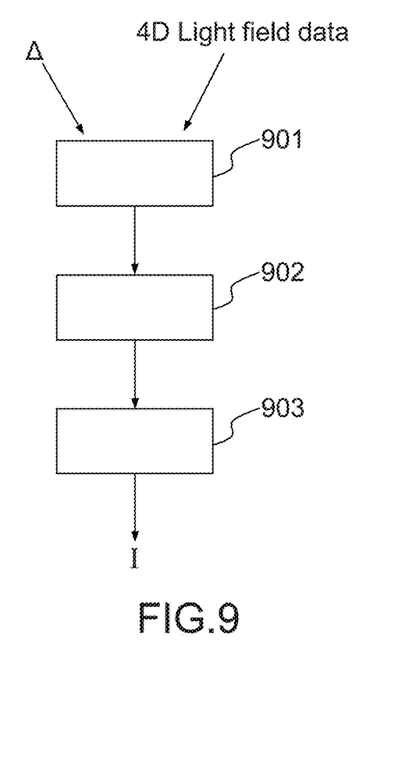
FIG. 9 illustrates some steps of a method for refocusing an image from acquired light field data, said method taking into account either the shift correction parameter determined by the method described in FIG. 7.

FIG. 9 presents a flowchart according to one embodiment of the invention.

More precisely, the FIG. 9 illustrates some steps of a method for refocusing an image from acquired light field data, said method taking into account either the shift correction parameter determined by the method described in FIG. 7.

In a step referenced 901, a first image focused on at least a first plane is displayed via an electronic device, said first image been obtained from an inputted light field data.

In a step referenced 902, the selection of an object of interest, or a zone of interest (said zone being either a connected space or a disconnected space) that should be focused in is done. Such selection can be done via a user interface (the user touches for example the object of interest or the zone of interest, or use a grid of selection or a box to identify it, etc. . . . . In a variant, the selection is done automatically by using some configuration parameters (that define for example depth value range where to focus data).

In a step referenced 903, image refocusing with optical aberration corrections is done. More precisely, in the state of the art, refocusing of images can be done via the addition of sub-aperture images extracted/derived from the light field data: refocused images can be computed by summing-up the sub-aperture images $S(\alpha, \beta)$ taking into consideration the disparity $\rho_{focus}$ for which objects at distance $z_{focus}$ are in focus. The sub-aperture pixels positioned at coordinates $(\alpha, \beta)$ of the sub-aperture image $S(\alpha, \beta, u, v)$ are projected to the pixel at coordinate $(X, Y)$ according to the following equation:

$$\begin{bmatrix} X \\ Y \end{bmatrix} = s \begin{bmatrix} \alpha \\ \beta \end{bmatrix} + s\rho_{focus} \begin{bmatrix} u \\ v \end{bmatrix}$$

The 4D light field pixels $S(\alpha, \beta, u, v)$ are projected into the 2D refocused image. Preliminarily a refocused image R and a refocused image weight $R_{weight}$ are set to 0. The size of the refocused images $[N_X, N_Y]$ is set to s times the size of the sub-aperture images. The projection is performed by summing the projected pixels at the coordinate $(X, Y)$ into the refocused image. For each 4D light-field pixels projected, the refocused image weight is updated by adding 1 at the pixel coordinate $(X, Y)$:

$R(X, Y) +\!\!= S(\alpha, \beta, u, v)$ $R_{weight}(X, Y) +\!\!= 1$

The refocused image weight records how many 4D light-field pixels have been projected per coordinate $(X, Y)$. After projecting all 4D light-field pixels of $S(\alpha, \beta, u, v)$, the refocused image R is divided by the refocused image weight $R_{weight}$. This last step harmonizes the number of pixels received per coordinate $(X, Y)$.

Since the projected coordinates $(X, Y)$ are not necessarily integer coordinates, it is better to use interpolation technique to map a non-integer pixel coordinate $(X, Y)$ into the grid of the refocused image R and refocused image weight $R_{weight}$ (same interpolation function must be used when projecting into R and $R_{weight}$). Interpolation technique are commonly used, descriptions can be found in Bilinear Interpolation (http://en.wikipedia.org/wiki/Bilinear_interpolation).

Instead of doing so, the electronic device determines in step 1003 the following values:

$$\begin{bmatrix} X \\ Y \end{bmatrix} = s \begin{bmatrix} \alpha \\ \beta \end{bmatrix} + s\rho_{focus} \begin{bmatrix} u \\ v \end{bmatrix} + s\Delta(\alpha, \beta, u, v, \lambda, \rho, D, \Phi)$$

where $\Delta$ is the shift correction parameter, determined such that the spot diagrams of the refocused images are smaller than the one obtains with no correction. $\Delta$ indicates a local 2D shift associated to the pixel $(\alpha, \beta)$ of a sub-aperture image $S(u, v)$. Depending on the main-lens characteristics, $\Delta$ may also depend on the disparity ρ of the object, the wavelengths λ of the photons, the distance D between the main-lens to the sensor, the aperture Φ of the main-lens. The focalization described in this equation is $$\begin{bmatrix} X \\ Y \end{bmatrix} = s \begin{bmatrix} \alpha \\ \beta \end{bmatrix} + s\rho_{focus} \begin{bmatrix} u \\ v \end{bmatrix} + s\Delta(\alpha, \beta, u, v, \lambda, \rho, D, \Phi)$$

applied to the sub-aperture images.

In a variant, the image refocusing of step 903 with optical aberration corrections is done by using directly the micro-images instead of the sub-aperture images. Indeed, the equation $$\begin{bmatrix} X \\ Y \end{bmatrix} = s \begin{bmatrix} \alpha \\ \beta \end{bmatrix} + s\rho_{focus} \begin{bmatrix} u \\ v \end{bmatrix} + s\Delta(\alpha, \beta, u, v, \lambda, \rho, D, \Phi)$$

can be trivially converted into a projection equation applied directly on the raw light-field pixel L(x,y,i,j) (i.e. the set of micro-lens images) by mixing equation $$(\alpha, \beta, u, v) = \left(\left\lfloor \frac{x}{p} \right\rfloor, \left\lfloor \frac{y}{p} \right\rfloor, x \bmod p, y \bmod p\right)$$

into it. Thus, once the shift correction parameter $\Delta$ is determined (see FIG. 7), the aberration corrected refocused images can be computed either from the raw light-field pixels or from the pixels of the sub-aperture images.

In a variant, instead of using directly the shift correction parameter itself, a refocused image obtained from the method described in FIG. 9 can be used for performing the refocusing processing.

Figure 10:
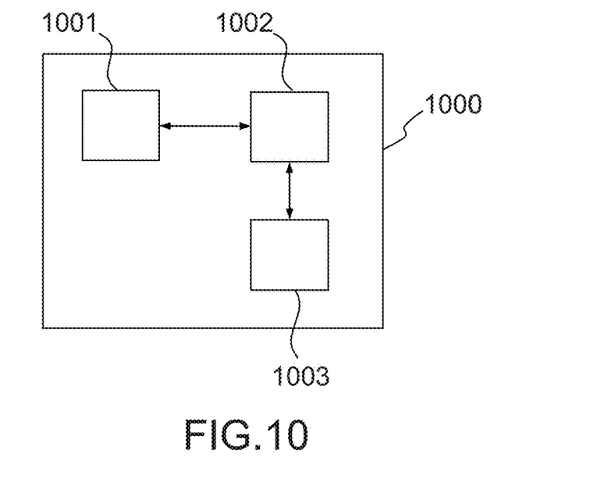
FIG. 10 presents an example of device that can be used to perform one or several steps of methods disclosed in the present document.

FIG. 10 presents an example of device that can be used to perform one or several steps of methods disclosed in the present document.

Such device referenced 1000 comprises a computing unit (for example a CPU, for "Central Processing Unit"), referenced 1001, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 1002. Computer programs are made of instructions that can be executed by the computing unit. Such device 1000 can also comprise a dedicated unit, referenced 1003, constituting an input-output interface to allow the device 1000 to communicate with other devices. In particular, this dedicated unit 1003 can be connected with an antenna (in order to perform communication without contacts), or with serial ports (to carry communications "contact"). It should be noted that the arrows in FIG. 10 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 10.

In one embodiment of the disclosure, the electronic device depicted in FIG. 10 can be comprised in a camera device that is configure to capture images (i.e. a sampling of a light field). These images are stored on one or more memory units. Hence, these images can be viewed as bit stream data (i.e. a sequence of bits). Obviously, a bit stream can also be converted on byte stream and vice versa.

It should also be noted that, instead of using a plenoptic camera as depicted in FIG. 1, similar results could be obtained with a so-called coded aperture cameras. Indeed these cameras allow taking pictures with a controlled fraction of the photons passing through the pupil of the main-lens. By taking several shots of the same scene with different mask set inside the pupil of the camera. It is possible to establish a relation between $\Delta$ and (u,v) as for the plenoptic camera. The correction $\Delta$ are thus computed for a series of images associated to a given series of masks set inside the pupil of the main-lens. This information can be used to correct the optical aberration of any shots using the same series of masks set inside the pupil.

The invention claimed is:

1. A method for obtaining a refocused image from a 4D raw light field data for a given focus ($z_{focus}$), the method being characterized in that it comprises applying a shift correction parameter on shifted and summed images from said 4D raw light field data, said shifted and summed images being defined as a function of said given focus ($z_{focus}$), and said shift correction parameter ($\Delta$) comprising, for at least a part of pixels of at least two sub-aperture images derived from at least one 4D light field data of a test-chart image, determined shifts for pixels belonging to said part of pixels between said at least two sub-aperture images, said test-chart image chosen to be textured and comprising patterns adequate to compute disparities between said sub-apertures images ensuring robustness of a shift estimation.

2. The method according to claim 1, wherein said determined shifts are obtained by a patch based shift estimation method that uses an expected shift (($u\rho$, $v\rho$)) between pixels of said at least two sub-aperture images.

3. The method according to claim 1, wherein said shifted and summed images correspond to shifted and summed sub-aperture images.

4. The method according to claim 1, wherein said shifted and summed images correspond to on shifted and summed micro-lens images.

5. The method according to claim 1, wherein said test chart image comprises locally contrasted textures visible on most of area of said at least two sub-aperture images derived from said 4D light field data of a test-chart image.

6. The method according to claim 1, wherein said shift correction parameter is correlated to a main lens aberration, said main lens being comprised in a device that has acquired said 4D light field data of a test-chart image.

7. The method according to claim 6, wherein said aberration is a spherical aberration.

8. The method according to claim 6, wherein said aberration is a chromatic aberration.

9. The method according to claim 1, wherein shift correction parameter is represented by a polynomial function.

10. The method according to claim 1, wherein said at least two sub-aperture images derived from at least one 4D light field data of a test-chart image are further derived from 4D light field data of a white image for a normalization process.

11. The method according to claim 1, wherein said shift correction parameter is further used on zoomed images derived from said 4D raw light field data.

12. The method according to claim 1, wherein said shift correction parameter ($\Delta$) comprises, for all the pixels of all sub-aperture images derived from at least one 4D light field data of a test-chart image, determined shifts for all the pixels.

13. A computer-readable and non-transient storage medium storing a computer program comprising a set of computer-executable instructions to implement a method for processing 4D raw light field data when the instructions are executed by a computer, wherein the instructions comprise instructions, which when executed, configure the computer to perform the method of claim 1.

14. An electronic device for obtaining a refocused image from a 4D raw light field data for a given focus ($z_{focus}$), the electronic device being characterized in that it comprises a module for applying a shift correction parameter on shifted and summed images from said 4D raw light field data, said shifted and summed images being defined as a function of said given focus ($z_{focus}$), and said shift correction parameter ($\Delta$) comprising, for at least a part of pixels of at least two sub-aperture images derived from at least one 4D light field data of a test-chart image, determined shifts for pixels belonging to said part of pixels between said at least two sub-aperture images, said test-chart image chosen to be textured and comprising patterns adequate to compute disparities between said sub-apertures images ensuring robustness of a shift estimation.

15. A method for calibrating a plenoptic camera, the method being characterized in that it comprises acquiring a 4 D light field data of a test-chart image, said test-chart image chosen to be textured and comprising patterns adequate to compute disparities between said sub-apertures images ensuring robustness of a shift estimation;

obtaining at least two sub-aperture images from said a 4D light field data;

and for at least a part of pixels of said at least two sub-aperture images, determining a shift correction parameter ($\Delta$) comprising determined shifts for pixels belonging to said part of pixels between said at least two sub-aperture images.

* * * * *